United States Patent
Takeo

(10) Patent No.: US 11,343,391 B2
(45) Date of Patent: May 24, 2022

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Akinori Takeo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/115,133

(22) Filed: Dec. 8, 2020

(65) Prior Publication Data

US 2021/0185185 A1 Jun. 17, 2021

(30) Foreign Application Priority Data

Dec. 13, 2019 (JP) .............................. JP2019-225151

(51) Int. Cl.
*H04N 1/00* (2006.01)

(52) U.S. Cl.
CPC ..... *H04N 1/00411* (2013.01); *H04N 1/00037* (2013.01); *H04N 1/00076* (2013.01); *H04N 1/00477* (2013.01)

(58) Field of Classification Search
None
See application file for complete search history.

(56) References Cited

U.S. PATENT DOCUMENTS

| | | | |
|---|---|---|---|
| 8,860,995 B2 | 10/2014 | Sakuragi et al. | ..... G06F 3/1213 |
| 9,148,539 B2 | 9/2015 | Takeo | ................ H04N 1/00875 |
| 9,239,694 B2 | 1/2016 | Takeo | ................... G06F 3/1285 |
| 9,467,585 B2 | 10/2016 | Takeo | ................ H04N 1/00856 |
| 2013/0050760 A1 | 2/2013 | Sakuragi et al. | ............. 358/1.15 |
| 2015/0092236 A1* | 4/2015 | Nishizaki | ............ G06F 3/04817 |
| | | | 358/1.16 |
| 2016/0028907 A1* | 1/2016 | Kato | ................... G06F 3/04845 |
| | | | 358/1.13 |
| 2019/0012056 A1* | 1/2019 | Kamoi | .................... G06F 3/167 |

FOREIGN PATENT DOCUMENTS

JP 2013-064977 4/2013

* cited by examiner

*Primary Examiner* — Frantz Bataille
(74) *Attorney, Agent, or Firm* — Venable LLP

(57) ABSTRACT

Provided is an image processing apparatus including a display operation unit, the image processing apparatus including: a memory; and a processor in communication with the memory, wherein the processor is configured to: display a predetermined operation screen for selectively displaying at least one of a plurality of buttons each for specifying processing to be executed; and execute, based on display, on the predetermined operation screen, of a button having an attribute in which processing corresponding to the button is started in response to a user operation on the button, a preparation operation for a processing unit corresponding to the button.

19 Claims, 12 Drawing Sheets

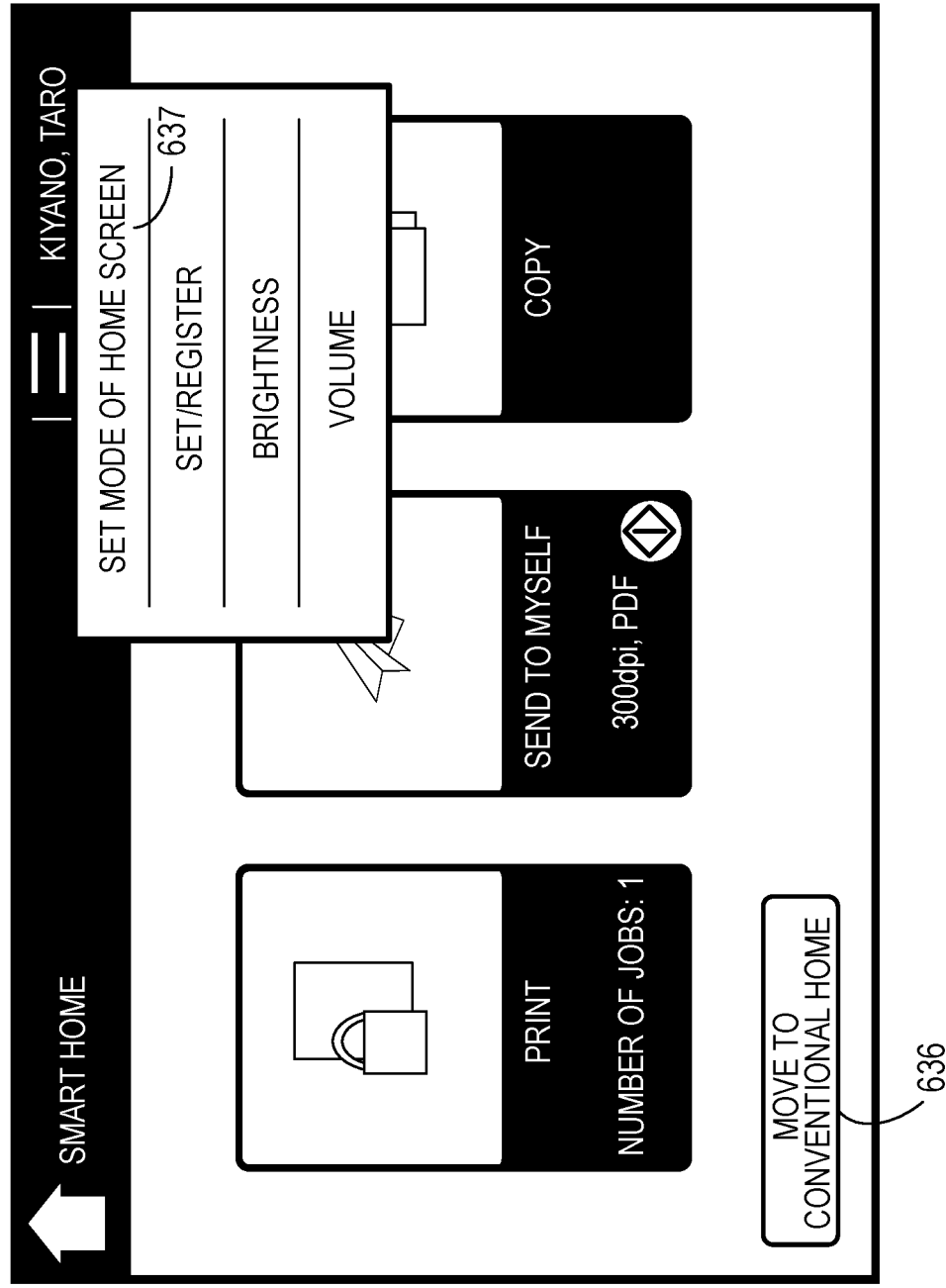

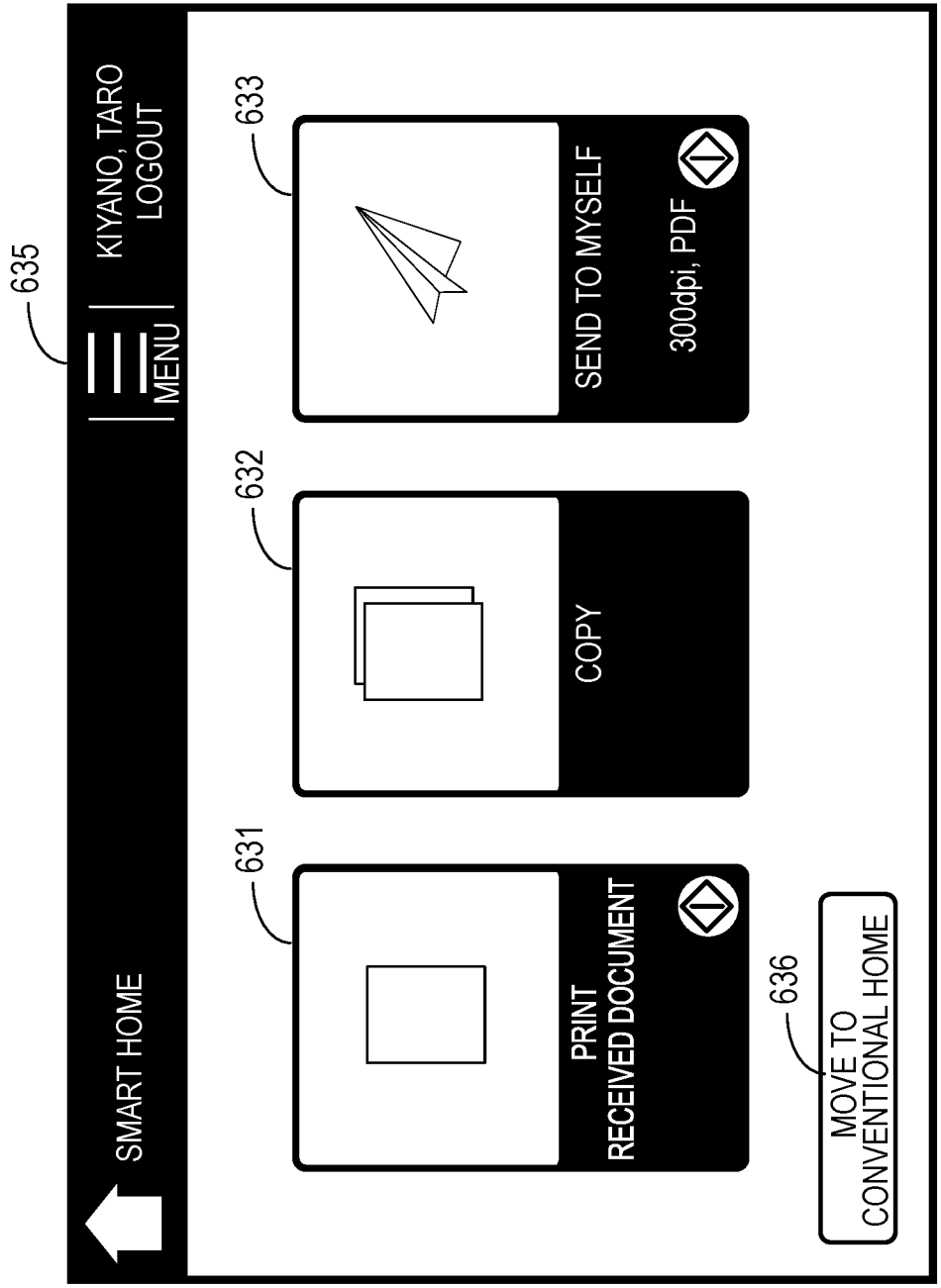

IMAGE PROCESSING APPARATUS, CONTROL METHOD FOR IMAGE PROCESSING APPARATUS, AND STORAGE MEDIUM

BACKGROUND OF THE INVENTION

Field of the Invention

The present invention relates to an image processing apparatus configured to execute an engine preparation operation corresponding to a job execution button displayed on an initial screen, a control method for an image processing apparatus, and a storage medium.

Description of the Related Art

There is an image processing apparatus capable of displaying, on a display operation unit of the apparatus, a portal screen for presenting, to a user, functions such as copying and scanning provided by the apparatus as buttons, after the user logs in to the apparatus. The user presses one of the buttons on the portal screen, to thereby be able to start setting and executing a corresponding function. Moreover, it is also possible to display, on the portal screen, an immediate execution button for enabling an immediate start of the execution of a corresponding function by pressing the button.

Incidentally, in order to reduce a period of time from an instruction given by the user to execute the function such as the copying, the scanning, or printing to image output or image generation, there has been known a related-art technology of starting a preparation operation for an engine relating to the function execution before the function execution instruction is given by the user. For example, the related-art technology is a technology of executing a preparation operation for an engine corresponding to each relevant function at a timing such as reception of a prior-inspection request for a print job, screen display of the print function, placement of an original on an ADF of a scanner, and a job setting operation on a screen for the copying function.

Meanwhile, in Japanese Patent Application Laid-Open No. 2013-64977, there is disclosed a printer configured to start a preparation operation for printing before print data is received when a request implying the printing is received and conditions for starting the preparation operation for the printing are satisfied.

However, in the printer described in Japanese Patent Application Laid-Open No. 2013-64977, when the immediate execution button is displayed on the portal screen, the preparation operation for the engine before the function execution may not be executed. For example, as a display method for the portal screen, when a received FAX document is stored in a storage area of the image processing apparatus, it is conceivable that an immediate execution button for immediately printing the received FAX document is displayed on the portal screen. In this case, a preparation operation for a printer engine is not executed when the immediate execution button for printing the received FAX document is simply displayed on the portal screen. Only after the user presses the immediate execution button, the preparation operation for the printer engine is executed, and after that, an image output operation is executed. Therefore, compared with a related-art case in which the printing is executed after a screen for received FAX documents is selected, a processing time period from the pressing of the immediate execution button to the output of the image is longer by a period of time required for the preparation operation for the printer engine. Thus, there has been a demand for an image processing apparatus configured to execute the preparation operation for the engine corresponding to the immediate execution button displayed on the portal screen, to thereby be able to execute job processing in a processing time period as short as that in the related-art case in which the job is executed after the selection of the function screen.

SUMMARY OF THE INVENTION

According to an aspect of the present invention, an image processing apparatus includes a display operation unit, and the image processing apparatus comprises: a memory; and a processor in communication with the memory, wherein the processor is configured to: display a predetermined operation screen for selectively displaying at least one of a plurality of buttons each for specifying processing to be executed; and execute, based on display, on the predetermined operation screen, of a button having an attribute in which processing corresponding to the button is started in response to a user operation on the button, a preparation operation for a processing unit corresponding to the button.

Further features of the present invention will become apparent from the following description of exemplary embodiments with reference to the attached drawings.

BRIEF DESCRIPTION OF THE DRAWINGS

FIG. 6A, FIG. 6B, FIG. 6C, FIG. 6D, and FIG. 6E are views for illustrating the initial screen.

DESCRIPTION OF THE EMBODIMENTS

Now, an embodiment of the present invention is described in detail with reference to the drawings. In this embodiment, an image processing apparatus is described as an example, but the present invention is not limited to the image processing apparatus. Moreover, all combinations of features described in this embodiment are not necessarily essential to solutions of the present invention.

First Embodiment

Hardware Configuration of Image Processing Apparatus

Figure 1:
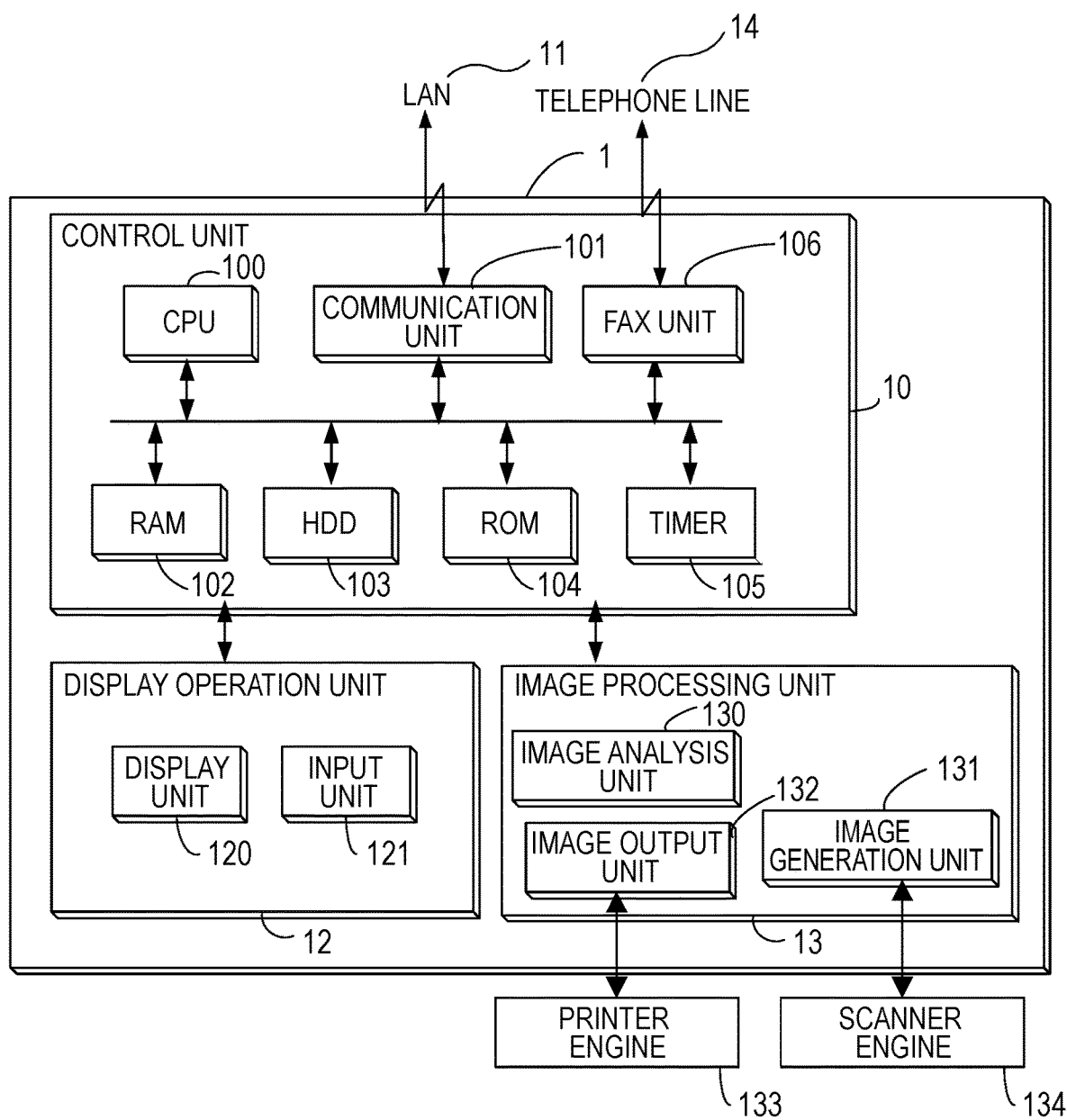
FIG. 1 is a block diagram for illustrating a configuration of an image processing apparatus according to an embodiment of the present invention.

FIG. 1 is a block diagram for illustrating a hardware configuration of an image processing apparatus 1 according to the embodiment of the present invention. The image processing apparatus 1 includes a control unit 10, a display operation unit 12, and an image processing unit 13.

The control unit 10 is configured to execute operation control for each unit of the image processing apparatus 1. The control unit 10 includes a CPU 100, a communication unit 101 connected to a LAN 11, a RAM 102, an HDD 103, a ROM 104, a timer 105, and a FAX unit 106 connected to a telephone line 14.

The CPU 100 is configured to control the entire control unit 10.

The communication unit 101 is configured to transmit and receive data through the LAN 11. The LAN 11 represents a network to be used to exchange data with external devices. The control unit 10 is connected to the Internet through the LAN 11.

The RAM 102 provides a system work memory for an operation of the CPU 100.

The HDD 103 stands for a hard disk drive, and may be a storage medium such as a magnetic disk, an optical disc, or a flash memory. The HDD 103 can store document data and setting data. Moreover, the HDD 103 may not exist inside the image processing apparatus 1. An external server or a PC may be used as a storage device through the communication unit 101.

The ROM 104 is a boot ROM, in which a boot program for the system is stored. The CPU 100 executes the boot program of the ROM 104 serving as the boot ROM to load programs installed in the HDD 103 onto the RAM 102, to thereby execute various types of control based on the programs.

The timer 105 is configured to measure a period of time in accordance with an instruction of the CPU 100, and notify the CPU 100 of an elapse of a period of time specified by the instruction through interrupt processing.

The FAX unit 106 is configured to transmit and receive fax data through the telephone line 14.

The display operation unit 12 is controlled by the control unit 10, and includes a display unit 120 and an input unit 121. The display unit 120 is a display configured to display, to a user, information on the image processing apparatus. The input unit 121 is configured to receive input from the user through interfaces, for example, a touch panel, a mouse, a camera, sound input, and a keyboard.

The image processing unit 13 is controlled by the control unit 10, and includes an image analysis unit 130, an image generation unit 131, and an image output unit 132.

The image analysis unit 130 is configured to analyze structure of an image of an original, and extract required information from an analysis result.

The image generation unit 131 is configured to cause a scanner engine 134 connected to the image processing unit 13 to operate to read (for example, scan) the original to digitize an image of the original, to thereby generate image data, and store the generated image data in the HDD 103. Moreover, the image generation unit 131 can also use information analyzed by the image analysis unit 130 to generate original image data having another format.

The image output unit 132 is configured to output image data stored in the HDD 103. As one method used for the output, the printer engine 133 connected to the image processing unit 13 is caused to operate, to thereby print the image data of the original on a paper sheet. Moreover, there are known a method of transmitting, through the communication unit 101 of the control unit 10, the image data to an external device, a server, and a facsimile device, for example, connected via the network and a method of storing the image data in a storage medium connected to the image processing apparatus 1.

Functional Blocks of Software

Figure 2:
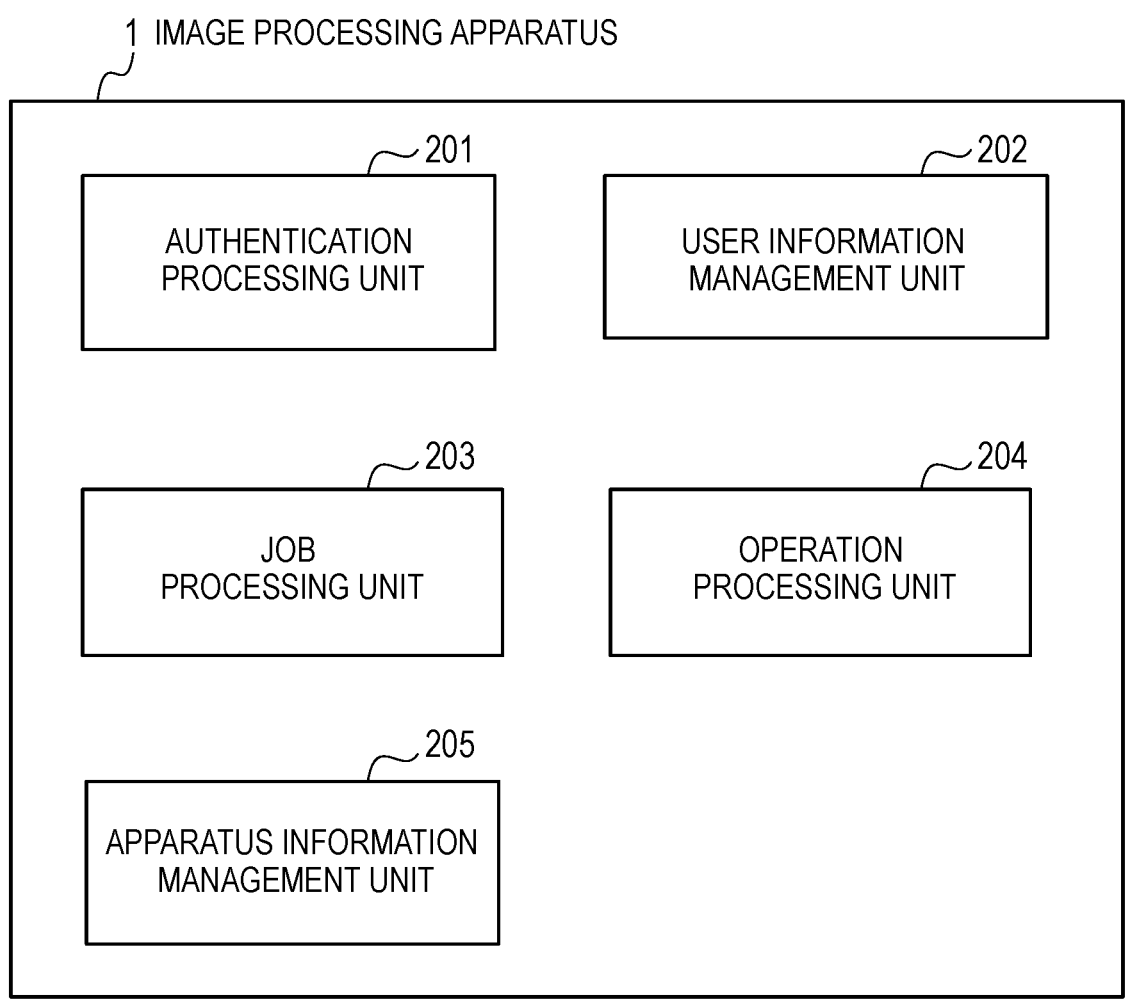
FIG. 2 is a functional block diagram of the image processing apparatus.

FIG. 2 is a block diagram for illustrating an example of functions of the image processing apparatus 1 of FIG. 1.

The image processing apparatus 1 includes, as its functions, an authentication processing unit 201, a user information management unit 202, a job processing unit 203, an operation processing unit 204, and an apparatus information management unit 205. The above-mentioned functional units are functions implemented by the CPU 100 executing the boot program of the ROM 104 serving as the boot ROM to load the programs installed in the HDD 103 to the RAM 102, and executing the loaded programs.

The authentication processing unit 201 is configured to execute processing of receiving a request for login or logout from the user and performing authentication, to thereby manage the user who uses the image processing apparatus 1.

The user information management unit 202 is configured to manage user information inquired by the authentication processing unit 201. For example, the user information management unit 202 manages a language (for example, "English" or "Japanese") used to use the image processing apparatus 1, to thereby be able to switch the used language for each user. Moreover, the user information management unit 202 can manage, for each user who has input a print job, the print job received from an external device through the communication unit 101.

The operation processing unit 204 is configured to control the display unit 120, to thereby display various types of information to the user. Further, the operation processing unit 204 is configured to receive and process an operation instruction from the user input from the input unit 121.

The apparatus information management unit 205 is configured to manage information on the entire image processing apparatus 1. As a specific example, there are known an IP address assigned to the apparatus and setting values common to all users using the apparatus. Information of the same types as those of the information managed by the user information management unit 202 can also be managed by the apparatus information management unit 205. For example, when the used language is "English" in the apparatus information management unit 205 and a user who has not specifically set the used language uses the apparatus, messages of English are presented to the user. However, when a certain user has set the used language to Japanese, it is also possible to present messages of Japanese to this user.

Login Processing

Figure 3:
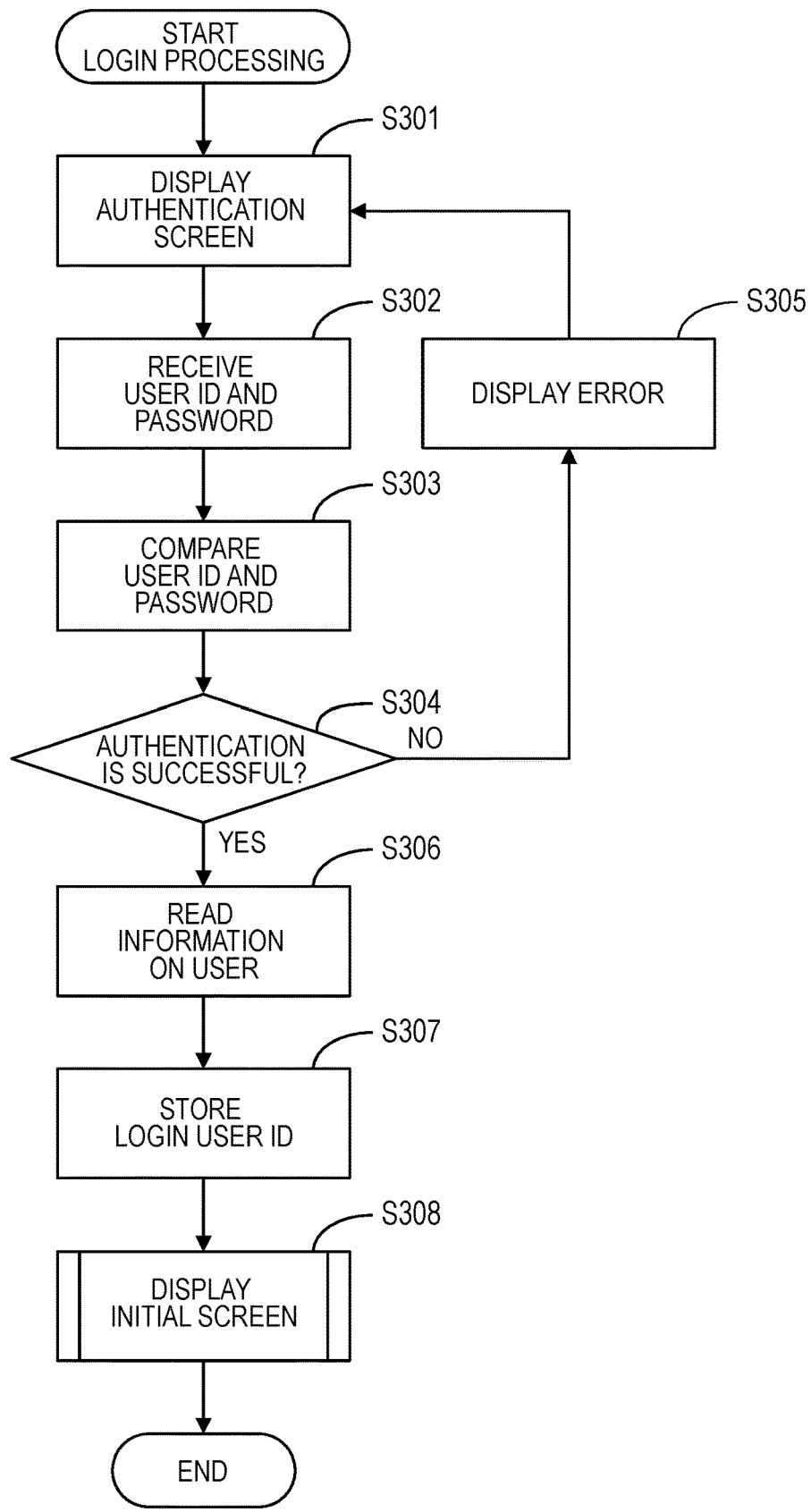
FIG. 3 is a flowchart of login processing (from authentication to initial screen).

With reference to a flowchart of FIG. 3, description is now given of processing from a start of the image processing apparatus 1 to display of an initial screen for a login user. The flowchart of FIG. 3 is implemented through processing executed by the authentication processing unit 201, the user information management unit 202, the job processing unit 203, the operation processing unit 204, and the apparatus information management unit 205.

Figure 4:
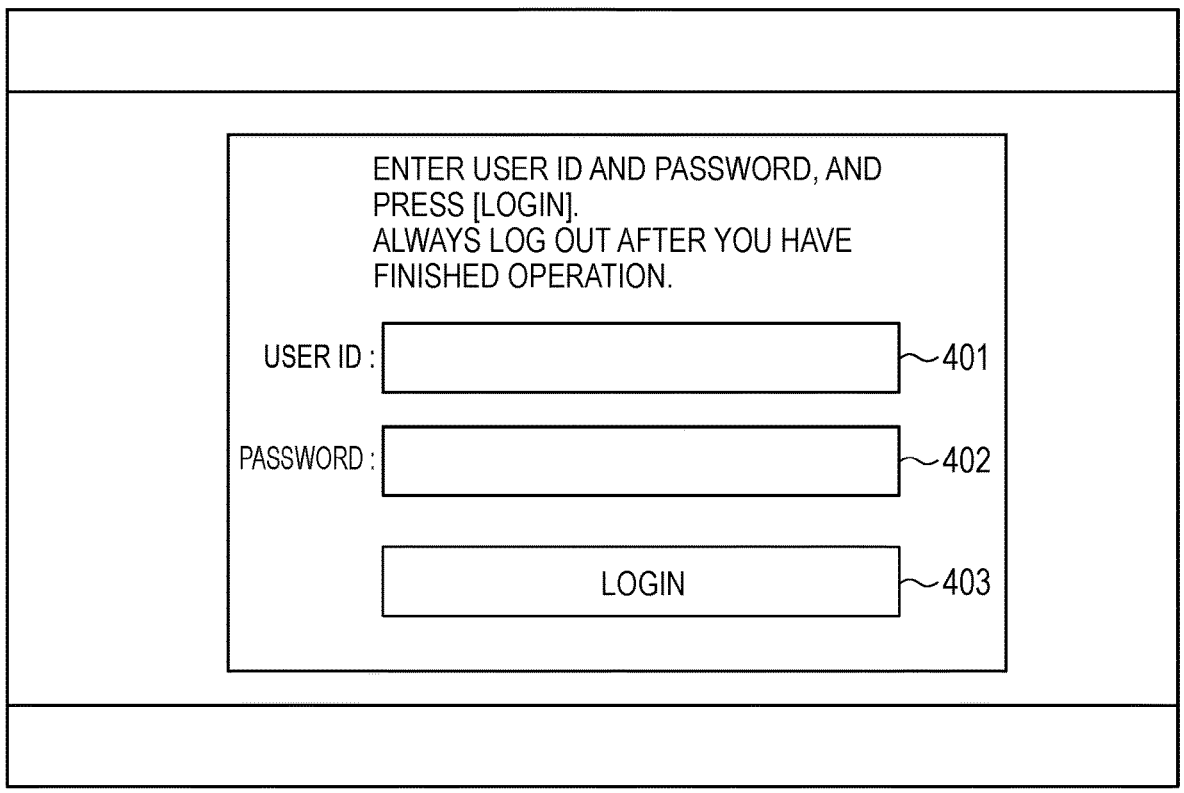
FIG. 4 is a view for illustrating an authentication screen.

In Step S301, first, the authentication processing unit 201 displays a login screen on the display unit 120 through the operation processing unit 204. A login request is made by a user using the login screen (FIG. 4) displayed on the display unit 120, to input a user ID and a password through the input unit 121. FIG. 4 is an example of the login screen displayed on the display unit 120.

In Step S302, the user makes the login request by inputting the login user ID and the password in a user ID input field 401 and a password input field 402, respectively, and then pressing a "LOGIN" key 403.

The login request may be received through input from an IC card reader or a biometric authentication device employing finger print authentication, for example, which is connected to the input unit 121 of the image processing apparatus 1.

In Step S303, when the authentication processing unit 201 receives the login request, the authentication processing unit 201 compares a user ID and a password stored in the HDD 103, and the input user ID and password with each other, to thereby determine whether or not the user IDs and the passwords match each other.

When the authentication processing unit 201 determines that "the input user ID and password do not match" in Step S304, the authentication processing 201 proceeds to Step S305. When the authentication processing unit 201 determines that "the input user ID and password match," the authentication processing 201 proceeds to Step S306.

In Step S305, the authentication processing unit 201 displays an error message for a certain period of time on the display unit 120 through the operation processing unit 204, and returns to Step S301 to display the login screen.

Meanwhile, in Step S306, the authentication processing unit 201 reads the information on the user stored in the HDD 103 through the user information management unit 202.

After that, in Step S307, the user ID of the user successfully authenticated in Step S304 is stored as a user who has currently logged in by being stored in the HDD 103.

After that, in Step S308, the operation processing unit 204 executes a subroutine of controlling display of an initial screen reflecting the read information on the logged-in user on the display operation unit 12. The initial screen in this embodiment is a screen presented to the user immediately after the user logs in to the apparatus. As an example of a screen that can be set as the initial screen, there are known screens for various types of applications, for example, a copying application that can perform setting for a copying job, and a portal screen (hereinafter referred to as "home screen") on which various types of applications can be selected. When the processing by the subroutine in Step S308 is finished, the processing of this routine is finished.

Initial Screen Display Processing

Figure 5:
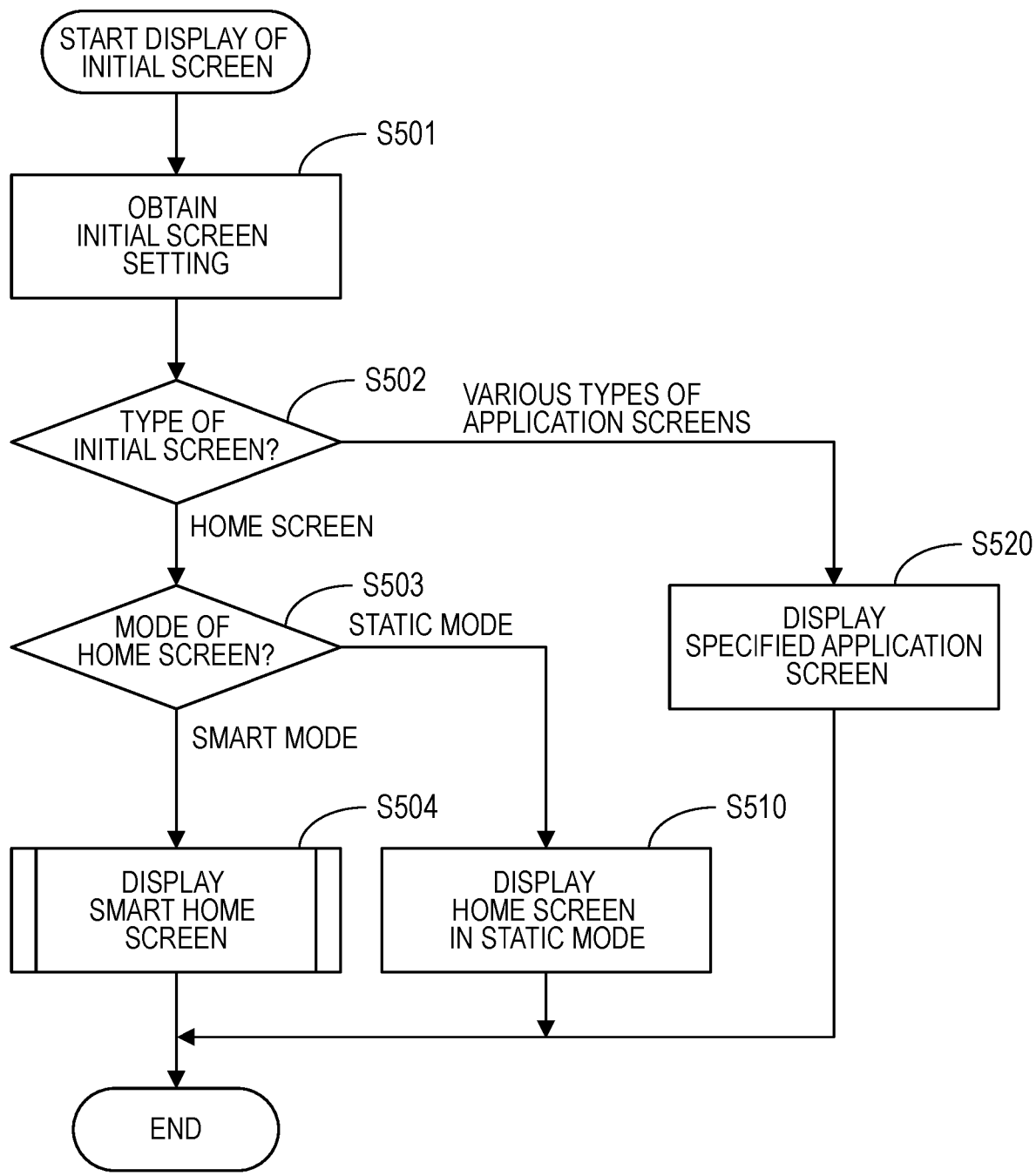
FIG. 5 is a flowchart of a subroutine for displaying the initial screen.

With reference to a flowchart of FIG. 5, description is now given of details of processing of a subroutine relating to the display control for the initial screen, which is executed in Step S308 of FIG. 3. The flowchart of FIG. 5 is implemented through processing executed by the authentication processing unit 201, the user information management unit 202, the job processing unit 203, the operation processing unit 204, and the apparatus information management unit 205.

In Step S501, the operation processing unit 204 obtains information on the initial screen from the user information management unit 202 and the apparatus information management unit 205, to thereby determine contents of the initial screen to be presented to the login user. Specifically, when a setting for the initial screen unique to the login user exists in the user information management unit 202, this setting is used. Otherwise, setting information on the initial screen stored in the apparatus information management unit 205 is used.

After that, in Step S502, the operation processing unit 204 determines the type (whether the home screen or one of the various types of application screens) of the initial screen in accordance with the information on the initial screen obtained in Step S501. When the initial screen is one of the various types of application screens, the operation processing unit 204 proceeds to Step S520. When the initial screen is the home screen, the operation processing unit proceeds to Step S503.

In Step S520, the operation processing unit 204 displays, as the initial screen, an application screen specified as the initial screen on the display operation unit 12, and finishes the processing of the subroutine.

Figure 6A:
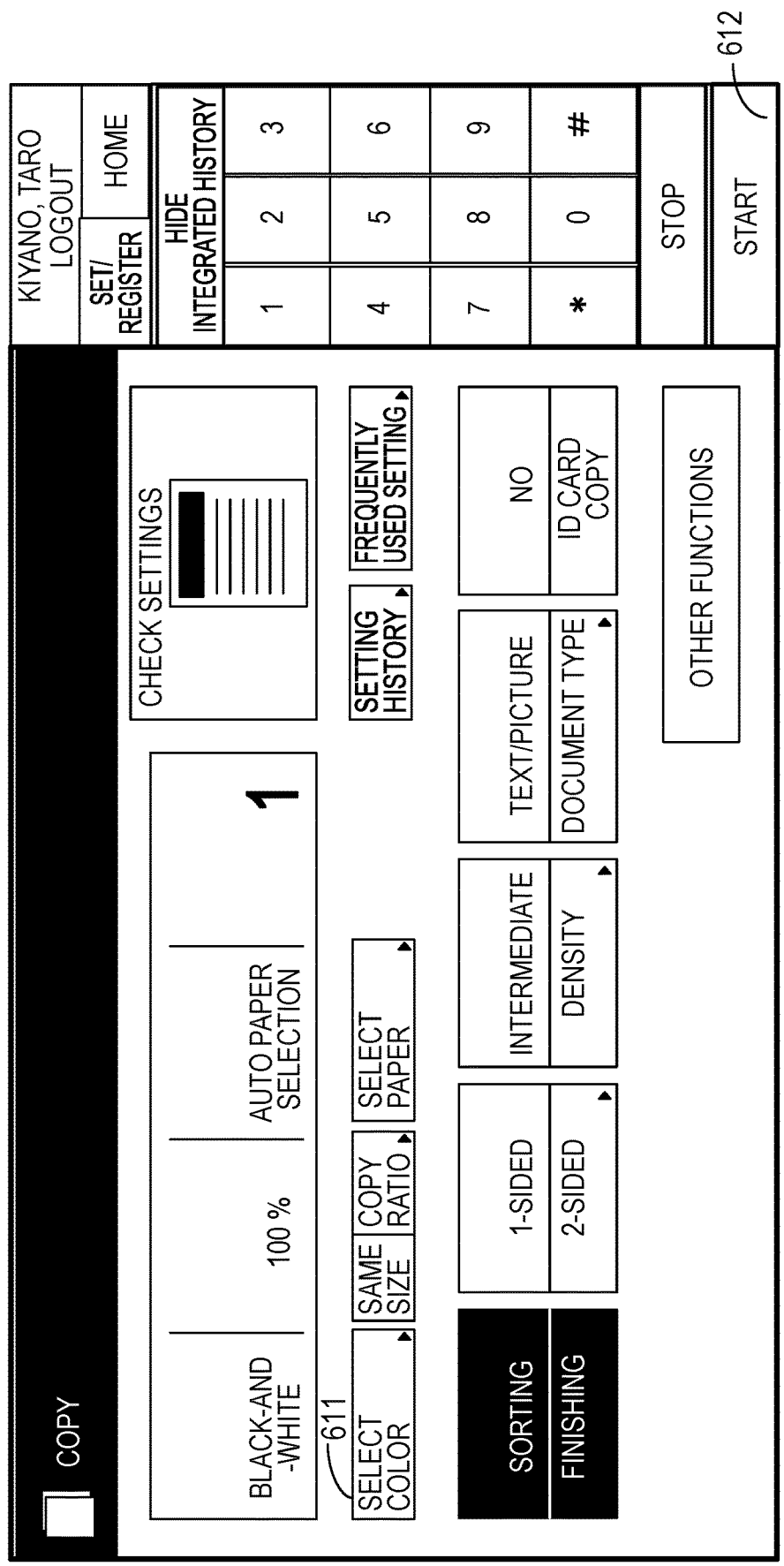

FIG. 6A is a view for illustrating an example of a copying application screen illustrated as one example of the various types of application screens. On the copying application screen, there are arranged screen elements such as a "SELECT COLOR" button 611 for receiving, from the user, display/change instructions for setting contents for the copying. Moreover, there is arranged a "START" button 612 for receiving an instruction for actually starting the copying in accordance with current setting contents. When the operation processing unit 204 detects pressing of this button, the operation processing unit 204 instructs the job processing unit 203 to execute a job in accordance with the setting contents.

In Step S503, the operation processing unit 204 determines a mode of the home screen. In this configuration, there are two types of modes of the home screen. One of the modes is a "static mode," and the other is a "smart mode." The "static mode" is basically a mode for displaying an initial screen, which is common to all of the users stored in the apparatus information management unit 205, and also has, for example, a customized display order of buttons specific to each user set in the user information management unit 202. Meanwhile, the "smart mode" is a mode in which contents and a display order of a plurality of smart buttons are dynamically changed in accordance with a state of the image processing apparatus 1 and a usage state of the user.

In Step S503, when the mode of the home screen is the static mode, the operation processing unit 204 proceeds to Step S510. When the mode of the home screen is the smart mode, the operation processing unit 204 proceeds to Step S504.

In Step S510, the operation processing unit 204 displays the home screen (FIG. 6B) in the static mode on the display operation unit 12, and finishes the processing of the subroutine.

Figure 6B:
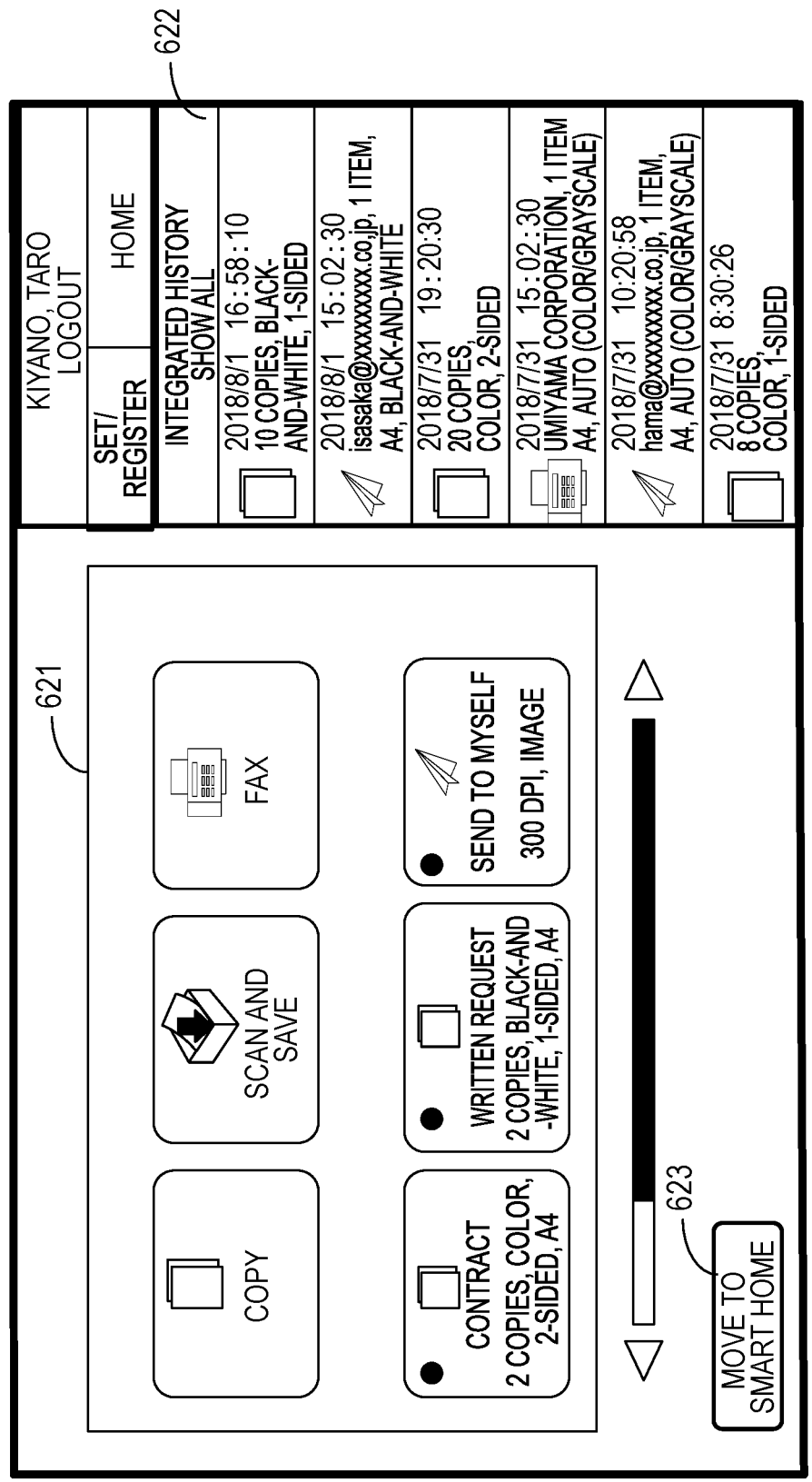

FIG. 6B is a view of an example of the home screen in the static mode. On the home screen in the static mode, there are arranged a button list region 621 for displaying, as buttons, applications available for the user and a history display region 622 for displaying a history of settings of jobs that have been executed by the user. Moreover, there is also arranged a "MOVE TO SMART HOME" button 623 for switching to the home screen (hereinafter referred to as "smart home screen") in the smart mode described later.

In Step S504, the operation processing unit 204 displays the smart home screen (FIG. 6C) on the display operation unit 12, and finishes the processing of the subroutine.

Figure 6C:
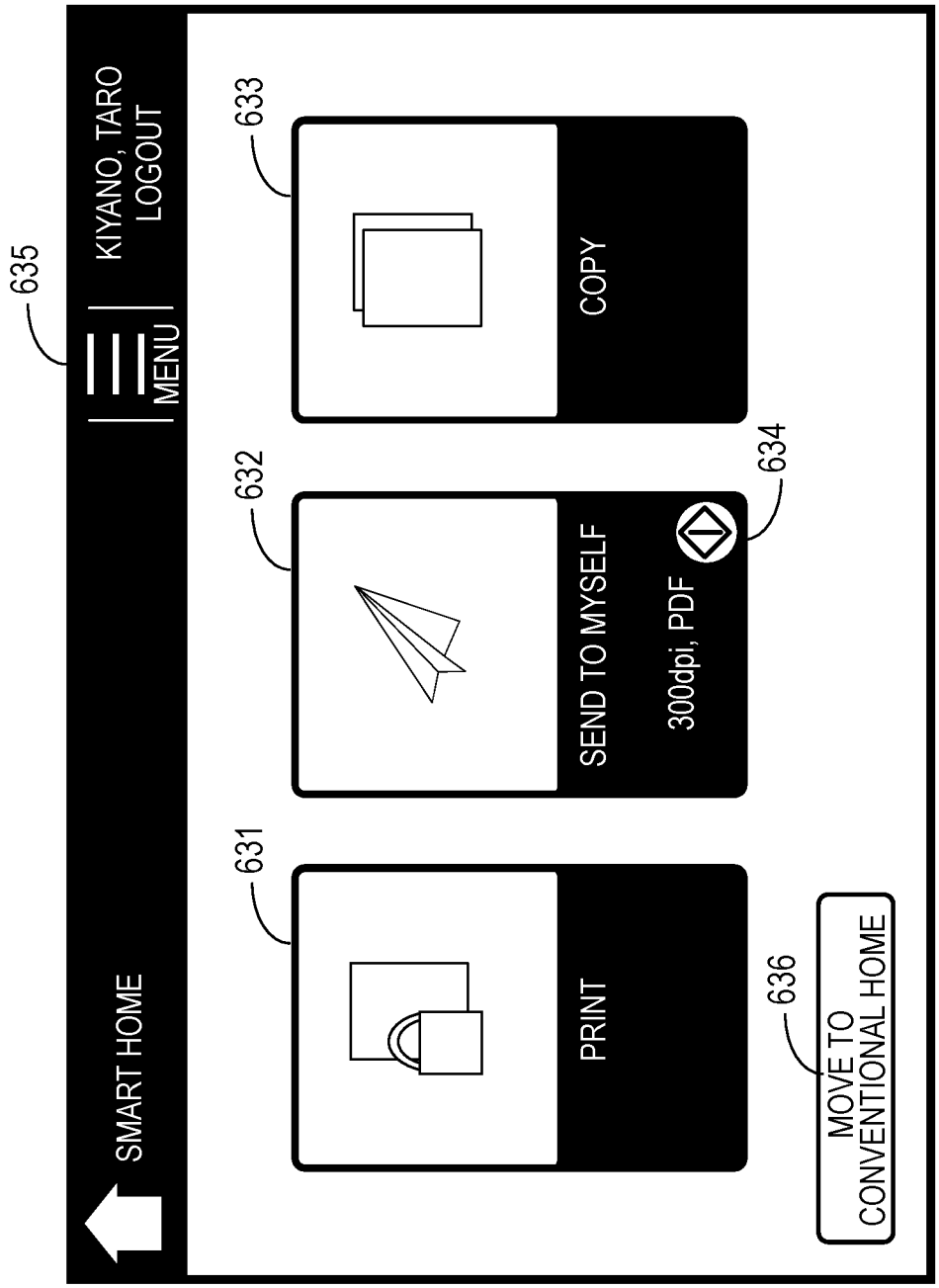

FIG. 6C is an example of the smart home screen. On the smart home screen, smart buttons 631 to 633 are displayed. Among the smart buttons, in addition to application buttons (smart buttons 631 and 633) to be used to move to application screens, for example, the copying application screen, there exists an immediate execution button (smart button 632) for starting execution of a job in certain settings. For example, the smart button 632 allows, by one click, an operation of saving a generated image to a transmission destination, for example, an email address associated with the login user. In this embodiment, an immediate execution icon 634 indicating that a job is to immediately be executed is arranged on the immediate execution button so as to have an appearance distinguished from other application buttons. Moreover, on the smart home screen, there is arranged a menu button 635. A menu screen (FIG. 6D) allowing display and changes of various types of settings can be displayed by pressing the menu button 635. On the menu screen, there are displayed various types of menus including a mode setting menu 637 for the home screen to set the mode of the home screen referred to in Step S503. Moreover, on the smart home screen, there is arranged a "MOVE TO CONVENTIONAL HOME" button 636 for moving to the home screen in the static mode exemplified in FIG. 6B.

Both of the home screen in the static mode of FIG. 6B and the smart home screen of FIG. 6C and FIG. 6D are screens for invoking an application screen or for executing a job in predetermined settings. However, those two modes are different in functionality provided for the mode.

An arrangement of buttons of the home screen in the static mode can basically be customized by the user oneself after the screen common to all of the users is provided. In other words, unless the user oneself customizes the home screen in the static mode, the user uses the same screen as those of other users.

Meanwhile, on the smart home screen, the contents and the display order of the smart buttons presented to the user are dynamically changed in accordance with the state of the image processing apparatus 1 and the usage state of the image processing apparatus 1 by the user. Therefore, the smart home screen has such a feature that the user oneself is not required to actively customize the screen unlike the home screen in the static mode.

Figure 7:
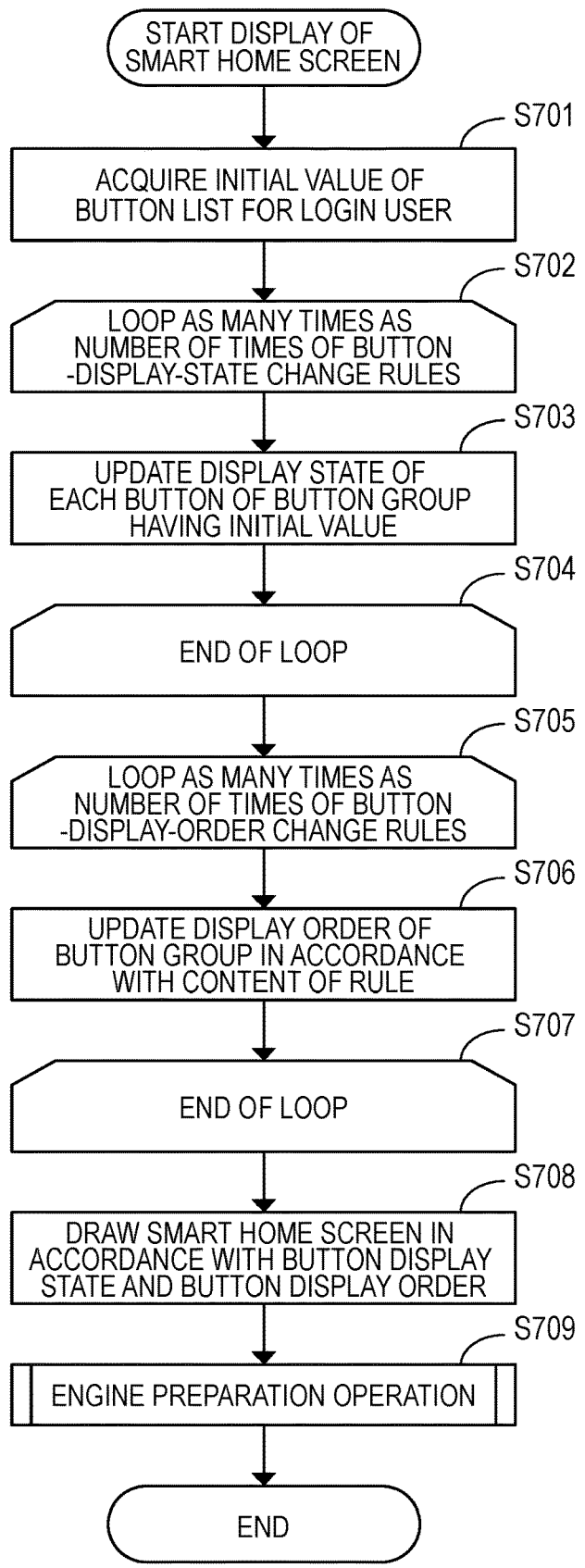
FIG. 7 is a flowchart of a subroutine for display processing for a smart home screen.

With reference to a flowchart of FIG. 7, description is now given of details of processing of a subroutine relating to the display of the smart home screen, which is executed in Step S504 of FIG. 5. The flowchart of FIG. 7 is implemented through processing executed by the authentication processing unit 201, the user information management unit 202, the job processing unit 203, the operation processing unit 204, and the apparatus information management unit 205.

In Step S701, the operation processing unit 204 obtains an initial value of a button list corresponding to the login user from the apparatus information management unit 205 and the user information management unit 202. In this case, the operation processing unit 204 may be configured to obtain the initial value from any one of the apparatus information management unit 205 and the user information management unit 202, or to mix contents of the initial values obtained from the apparatus information management unit 205 and the user information management unit 202. Table 1 shows an example of the button list after the processing in Step S701 is finished.

Each of the second and subsequent rows represents an individual smart button, and each column represents information relating to the button. Each column is now described.

"Identifier C101" is a unique numerical value assigned to the button.

"Button name C102" is a name of the button displayed on the smart home screen.

"Displayable C103" indicates whether or not the button is allowed to be used by the login user under the current state. That is, a button finally having a value "false" in the column of "Displayable C103" as a result of the execution of the processing in Step S701 is not presented to the user.

"Immediate execution C104" indicates whether or not a job is to be immediately executed by pressing the button.

"Relating to image output C105" indicates whether or not the button relates to the image output function.

"Relating to image generation C106" indicates whether or not the button relates to the image generation function.

"Relating to FAX reception C107" indicates whether or not the button relates to the FAX reception function.

"Used application C108" is a name of an application actually operating to execute the processing relating to the button.

Moreover, in this embodiment, the button list is managed as an ordered list, and it is assumed that the first button in the list is the first button in the display order. That is, in the button list shown in Table 1, the button having "001" as the value in the column of "Identifier C101" is a button having the highest display priority in presentation to the user. In the following steps, the operation processing unit 204 executes processing for the button list, and displays a smart home screen.

In subsequent loop processing in Step S702 to Step S704, the loop processing is executed as many times as the number of button-display-state change rules.

In Step S703, the operation processing unit 204 applies one or more of button-display-state change rules managed by the operation processing unit 204 to the button list after the processing in Step S701 is finished. The button-display-state change rule is a software module configured to input the button list and to change the value in the column of "Displayable C103" of each button included in the button list in accordance with a predetermined rule. In this embodiment, it is assumed that the button-display-state change rules are contained in the operation processing unit 204 in advance, but the button-display-state change rules may be managed in another form, for example, by being supplied from the outside of the image processing apparatus 1. As an example of the button-display-state change rule, it is conceivable that a state of a component of the image processing apparatus 1 is reflected to the value in the column of

TABLE 1

| Identifier (C101) | Button name (C102) | Displayable (C103) | Immediate execution (C104) | Relating to image output (C105) | Relating to image generation (C106) | Relating to Fax reception (C107) | Used application (C108) |
|---|---|---|---|---|---|---|---|
| 001 | Copy | true | false | true | true | false | Copy |
| 002 | Print received document | true | true | true | false | true | Confidential box |
| 003 | Send to myself | true | true | false | true | false | Scan and send |
| 004 | Fax | true | false | false | true | false | Fax |
| 005 | Scan and send | true | false | false | true | false | Scan and send |
| 006 | Print | true | false | true | false | false | Print |

"Displayable C103." Specifically, it is conceivable that when there occurs such an event that the FAX unit 106 is unavailable for a certain reason, the value in the column of "Displayable C103" is set to "false" in the row having "Fax" as the value in the column of "Used application C108." As described above, also when there exist various types of processing each triggered by a certain event to change the display state of the buttons, the rules can be treated in a unified manner in programs through implementation of the processing in the form of a software module as the button state change rule. Table 2 shows an example of the button list after the button-display-state change rule exemplified above is applied to the button list of Table 1 (after the loop processing in Step S702 to Step S704). In the row having "004" as the value in the column of "Identifier C101," the value in the column of "Displayable C103" is changed to "false."

TABLE 2

| Identifier (C101) | Button name (C102) | Displayable (C103) | Immediate execution (C104) | Relating to image output (C105) | Relating to image generation (C106) | Relating to Fax reception (C107) | Used application (C108) |
| --- | --- | --- | --- | --- | --- | --- | --- |
| 001 | Copy | true | false | true | true | false | Copy |
| 002 | Print received document | true | true | true | false | true | Confidential box |
| 003 | Send to myself | true | true | false | true | false | Scan and send |
| 004 | Fax | false | false | false | true | false | Fax |
| 005 | Scan and send | true | false | false | true | false | Scan and send |
| 006 | Print | true | false | true | false | false | Print |

Next, in loop processing in Step S705 to Step S707, the loop processing is executed as many times as the number of button-display-order change rules.

In Step S706, the operation processing unit 204 applies one or more of button-display-order change rules managed by the operation processing unit 204 to the button list after the processing in Step S704 is finished. The button-display-order change rule is a software module configured to input the button list and to change the order of buttons included in the button list. In this embodiment, it is assumed that the button-display-order change rules are contained in the operation processing unit 204 in advance, but the button-display-order change rules may be managed in another form, for example, by being supplied from the outside of the image processing apparatus 1. Moreover, in this embodiment, the following three rules are exemplified as the button-display-order change rules.

A first rule is a button-display-order change rule that changes the order of the button list in accordance with the states of the components of the image processing apparatus 1. Specifically, when the image generation unit 131 can read an original, the order of the button list is changed so as to move forward the order of the row of the button having the value of "true" in the column of "Relating to image generation C106" in the button list. Table 3 shows the button list after the button-display-order change rule is applied to the button list of Table 2.

TABLE 3

| Identifier (C101) | Button name (C102) | Displayable (C103) | Immediate execution (C104) | Relating to image output (C105) | Relating to image generation (C106) | Relating to Fax reception (C107) | Used application (C108) |
| --- | --- | --- | --- | --- | --- | --- | --- |
| 001 | Copy | true | false | true | true | false | Copy |
| 003 | Send to myself | true | true | false | true | false | Scan and send |
| 004 | Fax | false | false | false | true | false | Fax |
| 005 | Scan and send | true | false | false | true | false | Scan and send |
| 002 | Print received document | true | true | true | false | true | Confidential box |
| 006 | Print | true | false | true | false | false | Print |

A second rule is a button-display-order change rule that changes the order of the button list based on an operation of the login user performed on the image processing apparatus 1. Specifically, when the user registers a print job to the image processing apparatus 1, the order of the button list is changed so as to move forward the order of an application (in this embodiment, it is assumed that the job is "print") that can print the registered job. That is, the order of a row of a button having "print" as the value in the column of "Used application C108" is changed in the button list. Table 4 shows the button list after the button-display-order change rule is applied to the button list of Table 3.

determined button list. In this embodiment, three buttons are arranged on one screen, and first three button names, which are "PRINT RECEIVED DOCUMENT," "COPY," and "SEND TO MYSELF," are thus displayed in the display operation unit 12 as illustrated in FIG. 6E in the case of the button list shown in Table 5. In this case, the immediate execution icon 634 is added to the "PRINT RECEIVED DOCUMENT" button and the "SEND TO MYSELF" button having the "true" attribute as the values in the column of "Immediate execution C104."

Through the execution of the above-mentioned processing, when it is determined that the user is highly likely to

TABLE 4

| Identifier (C101) | Button name (C102) | Displayable (C103) | Immediate execution (C104) | Relating to image output (C105) | Relating to image generation (C106) | Relating to Fax reception (C107) | Used application (C108) |
|---|---|---|---|---|---|---|---|
| 006 | Print | true | false | true | false | false | Print |
| 001 | Copy | true | false | true | true | false | Copy |
| 003 | Send to myself | true | true | false | true | false | Scan and send |
| 004 | Fax | false | false | false | true | false | Fax |
| 005 | Scan and send | true | false | false | true | false | Scan and send |
| 002 | Print received document | true | true | true | false | true | Confidential box |

A third rule is a button-display-order change rule that changes the order of the button list in accordance with the states of the components of the image processing apparatus 1. Specifically, when a received FAX document already stored in the HDD 103 is detected, the order of the button list is changed so as to move forward a row of a button having "Confidential box" in the column of "Used application C108." Table 5 shows the button list after the button-display-order change rule is applied to the button list in Table 2.

perform an operation relating to the image generation or the printing, an operation of selecting an appropriate button to give an instruction is facilitated.

The number of buttons that can be drawn on the smart home screen is limited, and operations of buttons that are hidden but can originally be displayed can be performed by pressing a button of the "MOVE TO CONVENTIONAL HOME" button 636. Moreover, for processing that cannot be drawn as a button having the immediate execution icon on the smart home screen, engine preparation operation has

TABLE 5

| Identifier (C101) | Button name (C102) | Displayable (C103) | Immediate execution (C104) | Relating to image output (C105) | Relating to image generation (C106) | Relating to FAX reception (C107) | Used application (C108) |
|---|---|---|---|---|---|---|---|
| 002 | Print received document | true | true | true | false | true | Confidential box |
| 001 | Copy | true | false | true | true | false | Copy |
| 003 | Send to myself | true | true | false | true | false | Scan and send |
| 004 | Fax | false | false | false | true | false | Fax |
| 005 | Scan and send | true | false | false | true | false | Scan and send |
| 006 | Print | true | false | true | false | false | Print |

As described above, when there exist various types of processing triggered by a certain event to change the display order of the buttons, the rules can be treated in a unified manner in programs through implementation of the processing in the form of a software module as the button-display-order change rule.

In addition, even when there exist a large number of events that influence the display order, a display order can be determined by appropriately managing the order of the application of the button-display-order change rules without managing all patterns of the button display order for combinations of the events.

The flowchart of FIG. 7 is described again.

In Step S708, the operation processing unit 204 draws a smart home screen in accordance with the content of the been performed by processing in Step S709 described below, and hence a period of time until the image output or the image generation becomes shorter compared with a case in which the engine preparation operation is not performed.

In Step S709, the operation processing unit 204 executes the engine preparation operation corresponding to the display contents of the smart home screen processed in Step S708, and finishes the processing of this flowchart. Details of the processing in Step S709 are described with reference to FIG. 8.

As described above, operability at the time when the user uses the apparatus can be increased by providing the home screen that switches the presented contents based on the state of the image processing apparatus 1 and the operation performed by the user on the image processing apparatus 1.

Engine Preparation Operation

Figure 8:
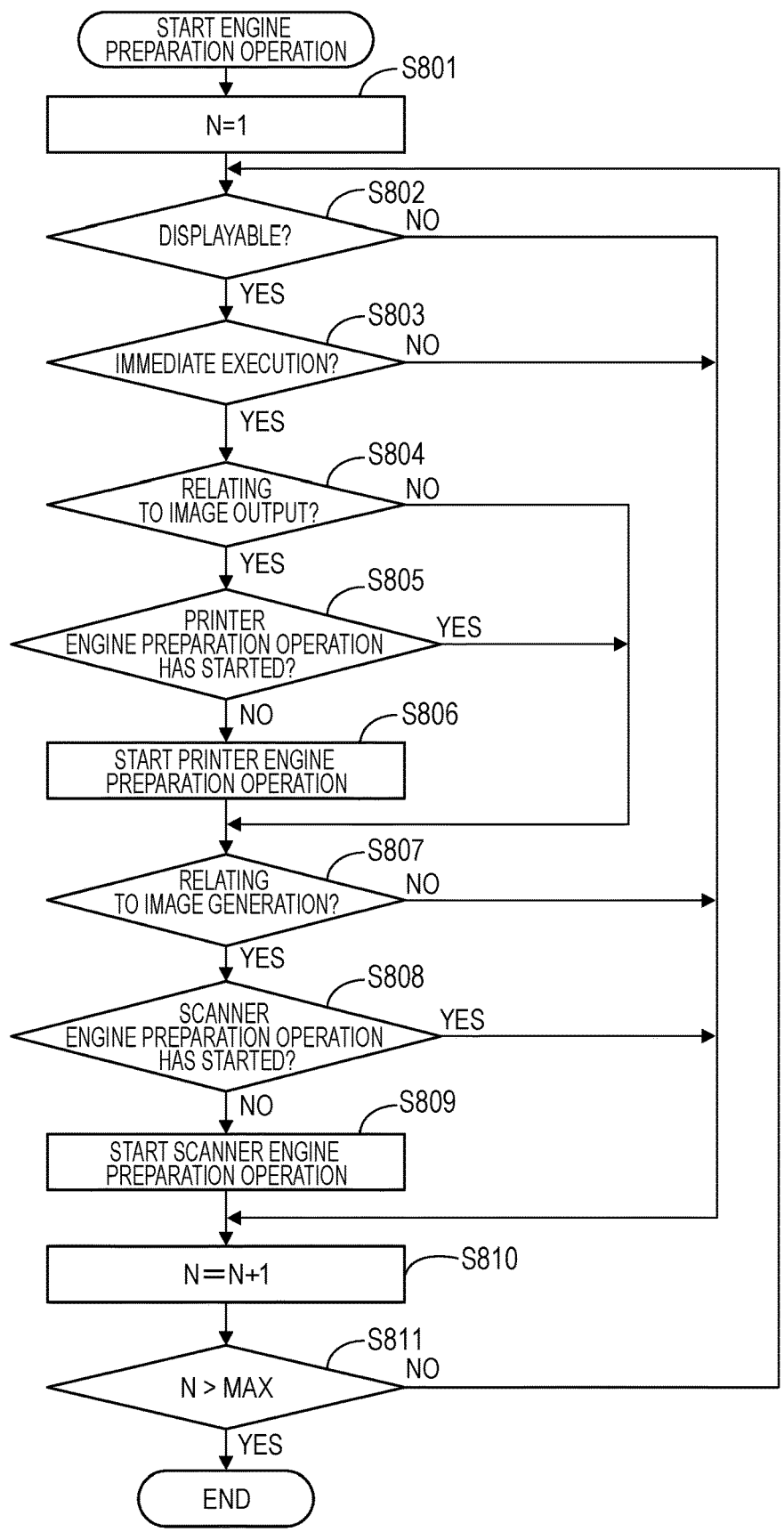
FIG. 8 is a flowchart of a subroutine for processing an engine preparation operation.

With reference to a flowchart of FIG. 8, the details of the engine preparation operation processing in Step S709 are now described. The flowchart of FIG. 8 is implemented through processing executed by the authentication processing unit 201, the user information management unit 202, the job processing unit 203, the operation processing unit 204, and the apparatus information management unit 205.

In Step S801, the operation processing unit 204 sets a display order N to 1 as an initial value in order to determine whether or not the engine preparation operation is required in order starting from the first button in the display order of the button list.

After that, in Step S802, the operation processing unit 204 determines whether or not the value in the column of "Displayable C103" is "true" for an N-th button in the display order of the button list of Table 5. When the value in the column of "Displayable C103" is "true," the operation processing unit 204 proceeds to Step S803. When the value in the column of "Displayable C103" is "false," the operation processing unit 204 proceeds to Step S810.

After that, in Step S803, the operation processing unit 204 determines whether or not the value in the column of "Immediate execution C104" is "true" for the N-th button in the display order of the button list of Table 5. When the value in the column of "Immediate execution C104" is "true," the operation processing unit 204 proceeds to Step S804 in order to determine whether or not to execute the engine preparation operation. When the value in the column of "Immediate execution C104" is "false," the operation processing unit 204 determines that the engine preparation operation is not required, and hence proceeds to Step S810.

In Step S804, the operation processing unit 204 determines whether or not the value in the column of "Relating to image output C105" is "true" for the N-th button in the display order of the button list of Table 5. When the value in the column of "Relating to image output C105" is "true," the button relates to the image output, and the operation processing unit 204 proceeds to Step S805 in order to determine whether or not the preparation operation for the printer engine is required. When the value in the column of "Relating to image output C105" is "false," an engine preparation operation relating to the image output, that is, a printer engine preparation operation, is not required, and hence the operation processing unit 204 proceeds to Step S807.

In Step S805, the operation processing unit 204 determines whether or not the preparation operation for the printer engine has been started. When the preparation operation has been started, the operation processing unit 204 proceeds to Step S807. When the preparation operation has not been started, the operation processing unit 204 proceeds to Step S806.

In Step S806, the operation processing unit 204 starts the preparation operation for the printer engine. In the preparation operation for the printer engine performed in this case, the operation processing unit 204 notifies the printer engine of an output color mode and an output paper size shown in Table 6 among parameters of a job to be immediately executed when the N-th button in the display order is pressed.

As an example of the preparation operation for the printer engine, there are executed preparation operations required to form an image, such as temperature control for a fixing drum and pre-rotation (processing of controlling a state of a surface of a photosensitive drum through rotation). Operation contents of those engine preparation operations may change in accordance with parameters of a job to be processed. Table 6 shows parameters of jobs relating to the preparation operation for the printer engine and a preparation operation for the scanner engine described later in this embodiment.

TABLE 6

| Relevant function | Parameters relating to engine preparation operation |
|---|---|
| Relating to image output (C105) | Output color mode |
| | Output paper size |
| Relating to image generation (C106) | Reading color mode |
| | Reading resolution |

In Step S807, the operation processing unit 204 determines whether or not the value in the column of "Relating to image generation C106" is "true" for the N-th button in the display order of the button list of Table 5. When the value in the column of "Relating to image generation C106" is "true," the button relates to the image generation, and the operation processing unit 204 proceeds to Step S808 in order to determine whether or not the preparation operation for the scanner engine is required. When the value in the column of "Relating to image generation C106" is "false," the engine preparation operation relating to the image generation, that is, the scanner engine preparation operation, is not required, and hence the operation processing unit 204 proceeds to Step S810.

In Step S808, the operation processing unit 204 determines whether or not the preparation operation for the scanner engine has been started. When the preparation operation has been started, the operation processing unit 204 proceeds to Step S810. When the preparation operation has not been started, the operation processing unit 204 proceeds to Step S809.

In Step S809, the operation processing unit 204 starts the preparation operation for the scanner engine. In the preparation operation for the scanner engine performed in this case, the operation processing unit 204 notifies the scanner engine of a reading color mode and a reading resolution shown in Table 6 among parameters of a job to be immediately executed when the N-th button in the display order is pressed.

As an example of the preparation operation for the scanner engine, there is executed a sensitivity adjustment operation (shading correction) for a reading sensor through reading of a reference white board.

Description is now given of the above-mentioned processing operation in a case of a row of the first button in the display order of the button list of Table 5 (the value in the column of "Button name C102" is "print received document").

First, in Step S802, the value in the column of "Displayable C103" is "true," and hence the operation processing unit 204 proceeds to Step S803. In Step S803, the value in the column of "Immediate execution C104" is "true," and hence the operation processing unit 204 proceeds to Step S804.

After that, in Step S804, the value in the column of "Relating to image output C105" is "true," and hence the operation processing unit 204 proceeds to Step S805. In Step S805, the preparation operation for the printer engine has not been started, and hence the operation processing unit 204 proceeds to Step S806, and starts the execution of the printer engine preparation operation.

After that, in Step S807, the value in the column of "Relating to image generation C106" is "false," and hence the scanner engine preparation operation is thus not required. Thus, the operation processing unit 204 proceeds to Step S810.

In Step S810, the operation processing unit 204 successively continues the processing in the display order of the button list, and thus increments the display order N of the button to be processed, and then proceeds to Step S811.

In Step S811, when the operation processing unit 204 determines that the display order N of the button to be processed exceeds the number of buttons (MAX) of the button list of Table 5, the operation processing unit 204 finishes the processing. Meanwhile, when the operation processing unit 204 determines that the display order N of the button to be processed does not exceed the number of buttons of the button list of Table 5, the operation processing unit 204 returns to Step S802, and continues the processing for the button having the display order N after the increment in display order.

As described above, when the smart home screen is displayed, the engine preparation operation corresponding to the immediate execution button can be executed in advance in accordance with the display order of the buttons before the user performs the button operation. Moreover, engine preparation operations corresponding to a plurality of immediate execution buttons such as the printer engine preparation operation for the print job and the scanner engine preparation operation for the scan job can be executed by executing the engine preparation operations corresponding to the plurality of immediate execution buttons in accordance with the display order.

Further, when engine preparation operations corresponding to a plurality of immediate execution buttons conflict with each other, contents of the engine preparation operations may be determined in accordance with the display order of the button list, to thereby execute the engine preparation operations.

With the above-mentioned configuration, the same preparation operation as the engine preparation operation for each function, which is executed on a screen for each function in the related art, can be executed before the function selection made by the user. Moreover, the period of time until the image output or the image generation at the time when the immediate execution button is pressed can be equivalent to that in the related-art case in which the job is executed on the conventional screen for each function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-225151, filed Dec. 13, 2019, which is hereby incorporated by reference herein in its entirety.

What is claimed is:

1. An image processing apparatus including a display unit, the image processing apparatus comprising:
a memory storing instructions; and
at least one processor executing the instructions causing the image processing apparatus to:
display a menu screen including a plurality of buttons each for executing each of a plurality of functions, wherein the menu screen includes at least one of first and second buttons, the first button causing, when selected, the image processing apparatus to display a setting screen for a first function to receive an instruction through the setting screen to execute the first function, the second button causing, when selected, the image processing apparatus to execute the first function; and
control the image processing apparatus to execute different preparation operations for the first function between a case of displaying the menu screen including the second button and a case of displaying the menu screen not including the second button.

2. The image processing apparatus according to claim 1, wherein the control of the image processing apparatus controls the image processing apparatus to execute different preparation operations for the first function between a case of displaying the menu screen including the second button and a case of displaying the menu screen not including the second button but including the first button.

3. The image processing apparatus according to claim 1, wherein the preparation operation for the first function is a preparation operation for an engine included in the image processing apparatus.

4. The image processing apparatus according to claim 1, wherein the preparation operation for the first function is executed in accordance with a parameter relating to the processing corresponding to the second button.

5. The image processing apparatus according to claim 1, wherein a display order of the buttons displayed on the menu screen is changed in accordance with a state of the image processing apparatus.

6. The image processing apparatus according to claim 5, wherein the preparation operation for the first function is executed based on a display order of the buttons displayed on the menu screen.

7. The image processing apparatus according to claim 1, wherein the menu screen is a home screen.

8. The image processing apparatus according to claim 1, wherein the preparation operation for the first function is any one of a preparation operation for a printer engine and a preparation operation for a scanner engine.

9. A control method for an image processing apparatus, the control method comprising:

displaying a menu screen including a plurality of buttons each for executing each of a plurality of functions, wherein the menu screen may include at least one of first and second buttons, the first button causing, when selected, the image processing apparatus to display a setting screen for a first function to receive an instruction through the setting screen to execute the first function, the second button causing, when selected, the image processing apparatus to execute the first function; and controlling the image processing apparatus to execute different preparation operations for the first function between a case of displaying the menu screen including the second button and a case of displaying the menu screen not including the second button.

10. The image processing apparatus according to claim 1, wherein a preparation processing of an engine for executing the first function is executed based on displaying the menu screen including the second button.

11. The image processing apparatus according to claim 10, wherein the preparation processing is not executed if the menu screen not including the second button is displayed.

12. The image processing apparatus according to claim 1, wherein the control of the image processing apparatus controls the image processing apparatus to execute the preparation operations for the first operation in different timings between a case of displaying the menu screen including the second button and a case of displaying the menu screen not including the second button.

13. An image processing apparatus including a display unit, the image processing apparatus comprising:

a memory storing instructions; and at least one processor executing the instructions causing the image processing apparatus to:

execute a login processing of a user in a preparation state after starting up the image processing apparatus to display an initial screen for the user, wherein the initial screen is set for each user and the initial screen displayed is a menu screen including a plurality of buttons for executing each of a plurality of functions;

execute a preparation operation for the function if the button which when selected causes the image processing apparatus to execute the function is included in the menu screen.

14. The image processing apparatus according to claim 13, wherein the preparation operation for the function is executed if displaying the menu screen including the button which when selected causes the image processing apparatus to execute the function.

15. The image processing apparatus according to claim 13, wherein the preparation operation for the function is any one of a preparation operation for a printer engine and a preparation operation for a scanner engine.

16. The image processing apparatus according to claim 13, wherein the button which when selected causes the image processing apparatus to execute the function is a button for executing printing, and wherein the preparation operation for the function is a preparation operation for a printer engine.

17. The image processing apparatus according to claim 13, wherein the preparation operation for the function is not executed if the menu screen does not include the button which when selected causes the image processing apparatus to execute the function.

18. The image processing apparatus according to claim 13, wherein the menu screen includes a button causing, when selected, the image processing apparatus to display a setting screen for the function.

19. A control method for an image processing apparatus, the control method comprising:

executing a login processing of a user in a preparation state after starting up the image processing apparatus to display an initial screen for the user, wherein the initial screen is set for each user and the initial screen displayed is a menu screen including a plurality of buttons for executing each of a plurality of functions;

executing a preparation operation for the function if the button which when selected causes the image processing apparatus to execute the function is included in the menu screen.

* * * * *